(12) United States Patent
Ranjan et al.

(10) Patent No.: US 11,559,157 B1
(45) Date of Patent: Jan. 24, 2023

(54) BIODEGRADABLE AND SAFE DRINKING STRAWS FROM DATE PALM LEAVES AS SUBSTITUTE FOR PLASTIC STRAWS

(71) Applicant: United Arab Emirates University, Al-Ain (AE)

(72) Inventors: Pranay Ranjan, Al-Ain (AE); Md. Zishan Akhter, Al-Ain (AE); Jeyaganesh Devaraj, Al-Ain (AE)

(73) Assignee: UNITED ARAB EMIRATES UNIVERSITY, Al-Ain (AE)

(*) Notice: Subject to any disclaimer, the term of this patent is extended or adjusted under 35 U.S.C. 154(b) by 0 days.

(21) Appl. No.: 17/536,613

(22) Filed: Nov. 29, 2021

(51) Int. Cl.
*A47G 21/18* (2006.01)
*C08L 1/02* (2006.01)
*C08L 97/02* (2006.01)

(52) U.S. Cl.
CPC .............. *A47G 21/18* (2013.01); *C08L 1/02* (2013.01); *C08L 97/02* (2013.01); *C08L 2201/06* (2013.01)

(58) Field of Classification Search
CPC ...................................................... A47G 21/18
See application file for complete search history.

(56) References Cited

U.S. PATENT DOCUMENTS

| | | | | |
|---|---|---|---|---|
| 2006/0192025 A1* | 8/2006 | White | ........... | B65D 77/28 239/24 |
| 2014/0263718 A1* | 9/2014 | Marouthis | ........... | A61C 15/02 239/33 |
| 2020/0054157 A1* | 2/2020 | Wu | ........... | A47G 21/18 |
| 2020/0063349 A1* | 2/2020 | Parker | ........... | D21H 25/005 |
| 2020/0138215 A1* | 5/2020 | Wu | ........... | A47G 21/18 |
| 2020/0305623 A1* | 10/2020 | Steele | ........... | B32B 29/02 |
| 2020/0368990 A1* | 11/2020 | Horton | ........... | A47G 21/186 |
| 2021/0362447 A1* | 11/2021 | Varghese | ........... | A61K 31/55 |
| 2022/0041865 A1* | 2/2022 | Li | ........... | C08L 67/04 |

OTHER PUBLICATIONS

James et al. (Asian Journal of Plant Sciences 18, 2019, 139-147) (Year: 2019).*
Al-Sulaiman (Applied Composite Materials 9: 369-377, 2002) (Year: 2002).*
Gao et al. (Food Sci Nutr. 2018 6:998-1005) (Year: 2018).*
M. Sigler, "The effects of plastic pollution on aquatic wildlife: Current situations and future solutions", Journal, 2014, 1-9, vol. 225, Water Air Soil Pollution.
K.L. Law, "Plastics in the marine environment", Article, 2017, 205-229, vol. 9, Annual Review of Marine Science.

(Continued)

*Primary Examiner* — Liam J Heincer
(74) *Attorney, Agent, or Firm* — Hayes Soloway PC (57) ABSTRACT

Biodegradable drinking straws from date palm leaves as a substitute for plastic straws. The straws are made by washing the palm tree leaves with a solution of ascorbic acid, 99% ethanol and water, cleaning the palm tree leaves with abrasive sheets, soaking the palm tree leaves, drying the palm tree leaves, heating the palm tree leaves to a temperature selected from a range of 60° C. to 140° C., rolling the palm tree leaves, binding the rolled palm tree leaves using biodegradable food grade adhesive, drying the rolled palm tree leaves.

17 Claims, 5 Drawing Sheets

(56) References Cited

OTHER PUBLICATIONS

D. Adamcova, "Analysis of biodegradability of degradable/biodegradable plastic material in controlled composting environment". Journal, 2016, 1-10, vol. 17, Journal of Ecological Engineering.

C. Wilcox, "Threat of plastic pollution to seabirds is global, pervasive and increasing", Journal, 2015, 11899-11904, vol. 112, PNAS.

C. Ritschel, "Why is plastic bad for the environment and how much is in the ocean", Article, 2018, [accessed on Jul. 19, 2022] <https://www.independent.co.uk/life-style/plastic-badenvironment-why-ocean-pollution-how-much-single-usefacts-recycling-a8309311.html>.

H.K. Webb, "Plastic degradation and its environmental implications with special reference to poly (ethylene terephthalate)", Article, 2012, 1-18, vol. 5, Polymers.

M. Alam, "Production of ecofriendly handmade paper from wastepaper and other local biomass material", Journal, 2018, 147-155, vol. 6, Academic Journal of Environmental Science.

M. Jonoobi, "A review on date palm tree: properties, characterization and its potential applications", Journal, 2019, 1055-1075, vol. 7, No. 11, Journal of Renewable Materials.

Anonymous, "Palm tree waste management in the UAE", Advertisement, 2022, [accessed on Jul. 19, 2022] <https://vermeer-middleeast.com/environmental/palm-tree-wood-waste-management-uae/>.

S. Mousavi, "Immunomodulatory and Antimicrobial Effects of Vitamin C", Journal, 2019, 73-79, vol. 3, European Journal of Microbiology and Immunology 9.

J. Gao, "Effects of ethanol combined with ascorbic acid and packaging on the inhibition of browning and microbial growth in fresh-cut Chinese yam", 2018, Article, 2018, 998-1005, Food Science and Nutrition.

W.F. Tinto, "Chapter 22-Waxes", Journal, 2017, 443-455, Academic Press.

Mohammed J. Meziani, "Visible-light-activated bactericidal functions of carbon "Quantum" dots", Journal, 2016, 10761-10766, vol. 8, ACS Applied Materials & Interfaces.

Hanjun Sun, "Graphene quantum dots-band-aids used for wound disinfection", Journal, 2014, 6202-6210, vol. 8, ACS Nano.

M. FA, "Extracellular tau oligomers produce an immediate impairment of LTP and memory", Article, 2016, 1-15, vol. 6, Scientific Reports.

D. Wang, "Recent advances in graphene quantum dots for fluorescence bioimaging from cells through tissues to animals", Journals, 2015, 515-523, Particle & Particle Systems Characterization.

T.S. Sreeprasad, "Electron-tunneling modulation in percolating network of graphene quantum dots: fabrication, phenomenological understanding, and humidity/pressure sensing applications", Article, 2013, 1757-1763, NANO Letters.

Dong et al, "Blue luminescent graphene quantum dots and graphene oxide prepared by tuning the carbonization iegree of citric acid", Journal, 2012, 4738-4743, vol. 50, Carbon.

Ye et al, "Coal as an abundant source of graphene quantum dots", Article, 2013, 1-7, vol. 4, Nature Communications.

* cited by examiner

FIG. 1

| Diameter | Length |
|---|---|
| Narrow-4 mm | Smaller-140 mm |
| Regular-5.5 mm | Regular-210 mm |
| Wider-8 mm | Long-300 mm |
| Customizable | Customizable |

BIODEGRADABLE AND SAFE DRINKING STRAWS FROM DATE PALM LEAVES AS SUBSTITUTE FOR PLASTIC STRAWS

TECHNICAL FIELD

The present invention relates to a biodegradable drinking straw made from natural date palm leaves.

BACKGROUND OF THE INVENTION

Plastics have revolutionized our world. It prolonged a necessary and integral part of our life. However, it became a curse rather than a blessing. Plastic straw pollution is an epidemic. With the global plastic demand increasing every year, the rapid production of plastic products has surpassed the production of other man-made products.

The exponential developments of plastic items have exceeded the manufacturing of several non-plastic man-made products, with global plastic demand rising every year [1]. Since 2004, more than 50% of the furniture's and macrobiotics are made up of plastics and have severely hampered the environment due to the toxicity and non-biodegradability properties of the plastics [2]. Moreover, the rapid growth of the of plastic pollution is also attributed to the accumulation of plastic waste, which has increased over decades, particularly in the recent years [3-4]. Microplastics have been found in our drinking water, food supply, and bodies, just as easily as plastics can find their way into our oceans. The accumulated plastic not only hampers the climate, soil, and air, but severely damages aquatic life. We need to find alternatives to plastic packaging as 8 million tons of plastic products end up in the ocean every year [4-6]. Plastic pollution is a result of accumulation of plastic waste, which has increased over decades and particularly in recent years. The accumulated plastic finds its way into our lakes, rivers, and oceans, where marine life is in danger of ingesting plastic or being exposed to the pollutants that leach from it. Certain animal species may also get stuck or entangled in plastic waste, such as sea turtles, sea birds, and marine mammals. Every year, millions of turtles, seabirds and other animals die from complications directly associated with the use of plastic. It is estimated that some kind of plastic from the ocean has been eaten by as many as 70% of seabirds and 30% of turtles [4].

This is also an alarming condition from an insight of the United Nations' recent declaration that plastic-associated chemicals in food and freshwater could pose a significant health risk to humans. Plastics being cytotoxic and non-biodegradable possess a threat to marine life, animals, and human health. Certain chemicals found in plastics have been linked to cancer, weakened immunity, endocrine disruption, and other health problems. than 50% of the plastic used is in the form of straw and is being disposed of after single usage.

The growing concern of plastic usage is, in fact, more severe when plastic straws are being considered. They are amongst the highest single-use consumed products, (eg. in a restaurant or cafeteria during drinking of the juice or lemonade), and are fatal to marine animals when dumped in the lakes, rivers, and oceans. Few seminal reports suggest that plastic straws get stuck in the nose or mouth of sea turtles, sea birds, and marine mammals [5-6] and every year, millions of animals die from complications directly associated with the use of plastic. Moreover, it has been observed that dumping of plastic in oceans, rivers and ponds enters the aquatic food chain leading to death and progressive extinction of marine animals (as many as 70% of seabirds and 30% of turtles).

Developed countries such as the United State (US) have a consumption of nearly 5 tons of straws per day. Moreover, these straws synthesis includes use of chemicals that are toxic, and are found to be explosive in nature (on exposure to heat or elevated temperature) [6-8]. The use of alternatives to plastic straws has been one such significant change and there are several types of non-plastic straw available. There are several non-plastic straw choices available that are made from materials like paper, wheat stubble, and metal. Many restaurants across the world are now serving beverages with straws made from these materials. Though the paper-based product may be an easy and safe alternative to the plastic straw, the exploitation of trees for the production of paper straws is a growing challenge and heavily detrimental to the environment as it does not fit sustainability goals. [7-9]. Using wheat stubbles as straw is an alternative option, but they are not reusable. It is also an unrealistic choice for countries where wheat cultivation is not feasible due to the unavailability of suitable soil and climatic conditions. On the other side, metallic straws are reusable and have a longer shelf-life, but are not readily available in the market due to high cost and manufacturing complexity. Also, people do not prefer reusable straws because of health and hygiene concerns. Bamboo, metals, and wheat stubble are some replacements but are unrealistic to realize in most of the countries.

The invention of the present disclosure proposes as an alternative to the problem stated above the synthesis of a low-cost non-toxic, biodegradable organic straw using straws made from date palm leaves.

SUMMARY OF THE EMBODIMENTS

In representative embodiments, the invention is directed at a novel method for manufacturing a biodegradable drinking straw form date palm leaves as substitute for plastic straws.

The present invention has a significant impact not only for the environment, by making it a suitable substitute for replacing plastic, thereby reducing pollution, but also by recovering dried or waste date palm leaves, which are generally discarded or burned. This invention has economic benefits in recovering date palm leaves and reducing the need for plastic straws.

Another aspect of the environmental impact is that the straws are 100% natural and biodegradable and chemicals free because the adhesive used to bind them are of food grade category. Further, the proposed novel straws decompose, and therefore there is less possibility that they will end up in the ocean, thus preventing the harmful effects of plastic straws on marine life.

This invention describes a novel synthesis method for manufacturing a biodegradable drinking palm tree straw.

The straw of the present invention is a product of great interest for businesses like restaurants, hotels, bars, food-service, households, cafés, and the beverage industry. The only limitation of the date palm straw of the present invention is that it is non-flexible.

In certain embodiments, disclosed herein is a method for manufacturing a biodegradable drinking date palm tree straw.

In certain embodiments, the method for manufacturing the biodegradable drinking date palm tree straw of the present invention comprises washing date palm tree leaves with a solution of ascorbic acid, ethanol and water; cleaning the leaves with different grade of abrasive sheets in the range of 15 to 40 micron for softening of the leaves; soaking of the leaves; drying the leaves with hot air blow in an oven; hydrothermally heating the leaves; rolling followed by binding the leaves using synthetic or non-synthetic polymeric adhesives bound with Graphene Oxide Quantum Dots (GOQDs); drying the rolled and bound leaves.

In other embodiments, the palm tree leaves utilized to make the biodegradable drinking straw of this invention can be date palm tree leaves, coconut palm tree leaves, and oil palm tree leaves.

In a preferred embodiment, the palm trees leaves utilized to make the biodegradable drinking straw are date palm tree leaves.

In another embodiment, the straw of the present invention can be manufactured in different customized sizes, thus not only replacing normal lengthy straws but also the smaller straws that are mostly used in beverage industries.

In another embodiment, the proposed straw synthesis method opens up a low cost, non-toxic technique to make straws at industrial scale.

In another embodiments, the novel synthesis method eliminates all impurities as well as any kind of microbial growth on the leaves.

In another embodiments, the proposed synthetic or non-synthetic polymeric adhesives that can be used for the binding of the straw leaves can be Dowsil 732 Multipurpose Food Grade Silicon Sealant and starch-based resins.

In another embodiment of the present invention, the palm tree leaves are rolled to form a straw, comprising an elongated drinking tube impermeable to fluids, including an exterior surface and an interior surface, having an approximately circular cross-section, a first end and a second end opposite the first end.

BRIEF DESCRIPTION OF THE FIGURES

The invention can be better understood with reference to the following figures and description.

DETAILED DESCRIPTION OF SPECIFIC EMBODIMENTS

In a first embodiment of the present disclosure, a method is disclosed for manufacturing a biodegradable drinking palm tree straw, comprising the steps of (a) washing date palm tree leaves with less than 40% concentration solution of ascorbic acid, ethanol and water; (b) cleaning the leaves with different grade of abrasive sheets for softening of the leaves; (c) soaking of the leaves for 6 hour in water; (d) hot air blow dry the leaves in an oven; (e) hydrothermally heating the leaves at 80° C. to 120° C.; (f) Rolling followed by binding the leaves using synthetic or non-synthetic polymeric adhesives bound with Graphene Oxide Quantum Dots (GOQDs); (g) drying the leaves at standard temperature and pressure (STP) for 8 hours.

In one embodiment of the present invention, the palm tree leaves utilized to make the straws can be date palm tree (*Phoenix dactylifera*), coconut palm tree (*Cocos nucifera*), oil palm tree (*Elaeis guineensis*), acai palm (*Euterpe oleacea*), zombie palm tree (*Zombia antillarum*), windmill palm tree (*Trachycarpus fortune*), foxtail palm tree (*Wodyetia bifucata*), king palm tree (*Archontophoenix alexandrae*), triangle palm tree (*Dypsis decaryi*), pygmy date palm tree (*Phoenix roebellenii*), cliff date palm tree (*Phoenix rupicola*), Senegal date palm tree (*Phoenix reclinata*), Ceylon date palm tree (*Phoenix pusilla*), wild date palm tree (*Phoenix sylvestris*), Cretan date palm (*Phoenix theophrastii*), dwarf date palm (*Phoenix acaulis*), and other *Phoenix* hybrid species.

In a preferred embodiment of the present invention, the palm tree utilized to make the straws can be palm tree (*Phoenix dactylifera*), coconut palm tree (*Cocos nucifera*), oil palm tree (*Elaeis guineensis*).

In a most preferred embodiment of the present invention, the palm tree utilized to make the straws is the date palm tree (*Phoenix dactylifera*).

In one embodiment of the present invention, the palm tree leaves are washed with solution of ascorbic acid, 99% ethanol and water.

In a preferred embodiment of the present invention, the solution of ascorbic acid, ethanol, and water contains less that 50% v/v ascorbic acid.

In a most preferred embodiment of the present invention, the solution of ascorbic acid, ethanol, and water contains less that 40% v/v ascorbic acid.

In one embodiment of the present invention, the raw leaves are washed with less than 40% v/v concentrated ascorbic acid, ethanol and water to remove dirt and any kind of microbial growth.

In another embodiment of the present invention, the leaves are scrubbed using different grade of abrasive sheets and washed in ethanol twice under an ultrasonicator bath at a frequency of approximately 40/60 KHz for approximately 15 minutes, followed by a bath in deionized water (DI Water) for approximately 15 minutes. The abrasive sheets used have an abrasiveness range of 15 to 40 micron.

In another embodiment, the leaves are washed in an ultrasonicator bath at a frequency of approximately 40/60 KHz for a time ranging from 5 to 30 minutes.

In a preferred embodiment, the leaves are washed in an ultrasonicator bath at a frequency of approximately 40/60 KHz for a time ranging from 10 to 20 minutes.

In a most preferred embodiment, the leaves are washed in an ultrasonicator bath at a frequency of approximately 40/60 KHz for approximately 15 minutes.

In another embodiment, the water used to wash the leaves may be deionized water, distilled water, and/or reverse osmosis water.

In a preferred embodiment, the water used to wash the leaves is deionized water.

In another embodiment, the leaves are washed in a bath of purified water for a time ranging from 5 to 30 minutes.

In a preferred embodiment, the leaves are washed in a bath of purified water for a time ranging from 10 to 20 minutes.

In a most preferred embodiment, the leaves are washed in a bath of purified water for approximately 15 minutes.

In another embodiment of the present invention, the leaves are soaked in water at standard temperature and pressure (STP).

In another embodiment of the present invention, the leaves are exposed to hot air flow at e temperature ranging from 70° C. to 130° C. for a time ranging from 1 to 15 minutes.

In a preferred embodiment of the present invention, the leaves are exposed to hot air flow at e temperature ranging from 80° C. to 120° C. for approximately 5 minutes.

In another embodiment of the present invention, the leaves can be segregated into different containers depending on their length, thickness, and strength.

In another embodiment of the present invention, the leaves are subjected to a hydrothermal heating to a temperature ranging from 60° C. to 140° C.

In a preferred embodiment of the present invention, the leaves are subjected to a hydrothermal heating to a temperature ranging from 80° C. to 120° C.

In another embodiment of the present invention, the palm tree leaves are rolled to form a straw, comprising an elongated drinking tube impermeable to fluids, including an exterior surface and an interior surface, having an approximately circular cross-section, a first end and a second end opposite the first end.

In another embodiment of the present invention, the rolled palm tree leaves are bound with synthetic and/or non-synthetic polymeric adhesive.

In one embodiment of the present invention, GOQDs are added to the adhesives.

In a preferred embodiment of the present invention, GOQDs are dispersed and homogeneously mixed with the synthetic and/or non-synthetic polymeric adhesive.

In another embodiment of the present invention, the rolled leaves are dried at STP for approximately for 5 to 24 hours.

In a preferred embodiment of the present invention, the rolled leaves are dried at STP for approximately for 6 to 12 hours.

In a most preferred embodiment of the present invention, the rolled leaves are dried at STP for approximately 8 hour.

EXPERIMENTAL EXAMPLES

Material and Methods
Collection of Date Palm Leaves

Figure 1:
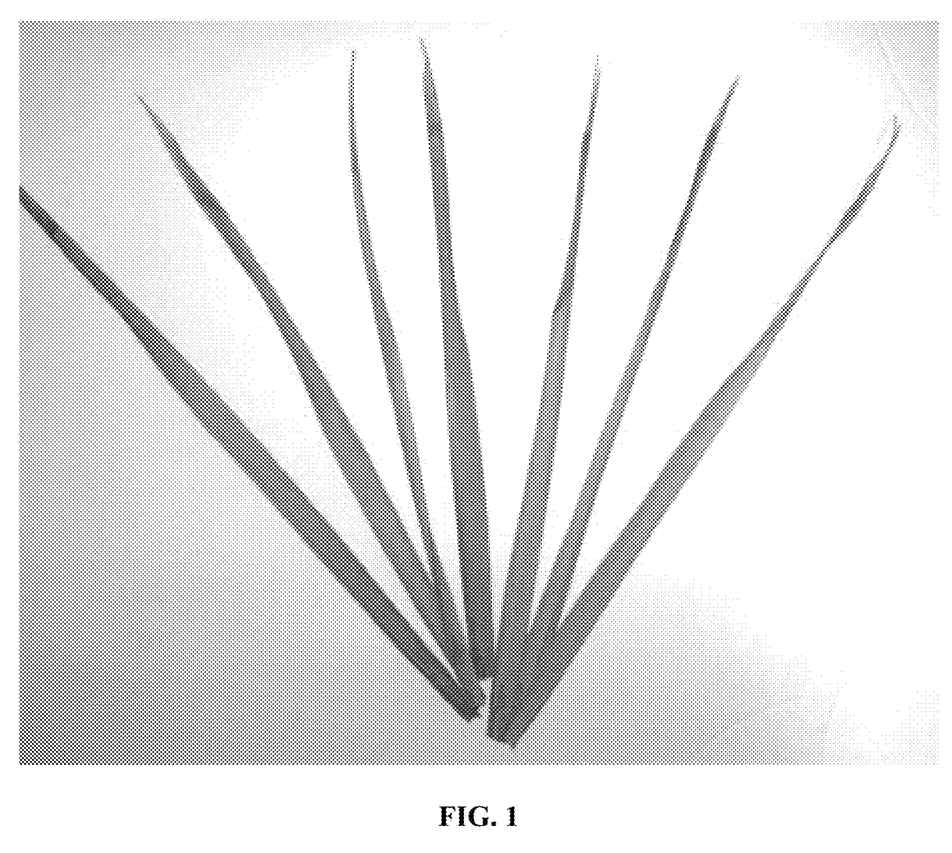
FIG. 1 shows date palm dried leaves.

The palm develops an average of 12 to 15 new leaves each year under natural growth conditions, and as a consequence, the same number can be assumed to be cut as part of the palm's maintenance. As this is applied to hundreds of thousands of trees, it may result in a large number of leaves becoming available each year. Leaflets vary in length from about 15 to 30 cm and in width from 1 to 3 cm (FIG. 1). The number of leaflets on one midrib may be in the range of 120 to 150. Dried leaves from *Phoenix dactylifera* (date palm) frond were collected from the farmland. Then the leaves undergone a thorough quality check for the selection of damage-free leaves from cracks, cuts & dimensions that well suit the application.

Experimental Steps

The experimental steps for manufacturing a straw utilizing date palm leaves include: (1) material collection of materials such as glue, dry leaves, etc. Straw is bound together with biodegradable food-grade glue that is completely secure when it gets in contact with beverages; (2) manufacturing the straw using the source of fab lab; (3) testing the straw to determine durability, aesthetic, reaction at cold and hot water; (4) testing product cytotoxicity since this product falls in food and beverage industry before commercializing into market; (5) long tipping test of straw in liquid to determine its shelf life. Also, determining storage condition (dry & cold), and packaging method to maintain the desired properties of the product.

Synthesis Process of Date Palm Tree Straw

The synthesis process of the date palm tree leaves straws includes the following steps: (a) Washing of the date palm tree leaves with less than 40% concentration solution of ascorbic acid, ethanol and water; (b) Cleaning the leaves with different grade of abrasive sheets for softening of the leaves; (c) Soaking of the leaves for 6 hour in water; (d) Hot air blow dry in an oven; (e) Hydrothermal heating of the leaves at 80° C. to 120° C.; (f) Rolling followed by binding of the leaves using synthetic or non-synthetic polymeric adhesives bound with GOQDs; (g) Room temperature drying of the leaves at standard temperature and pressure (STP) for 8 hours.

Ascorbic acid also called Vitamin-C is an organic as well naturally occurring compound that has anti-microbial properties [10]. It is the most effective and safest way to eliminate the growth of any microbes on the date palm leaves. Moreover, using a combination of ethanol and ascorbic acid had greater antimicrobial effects [11]. The combination of ascorbic acid and ethanol not only certify the elimination of germs but also removes any kind of organic/inorganic contaminants (dirt, glue, etc.) making the date-palm leaves more hygienic to process for straws.

Abrasive sheets were used to remove the top layer of the leaves, removing defects/discoloration, generating a pleasantly smooth finish while at the same time adding adhesion by increasing surface area through the development of small irregular rough lines/ridges/defects for the glue to stick properly. The abrasive sheets used have an abrasiveness range of 15 to 40 micron. Moreover, on boiling the leaves the naturally occurring wax in the leaves comes out and is segregated effectively in short time duration. It has a pleasant smell, good emulsification properties, and enhances better binding properties [12].

The GOQDs synthesized were dispersed and homogeneously mixed with the synthetic or non-synthetic adhesive will remove the voids and air bubbles that generally occurred while applying glue to any surface. In addition, GOQDs will offer antibacterial [13], disinfection systems (healing and wound disinfection) [14], anti-bio fouling [15], bio-imaging markers (for monitoring of health condition) [16], humidity and pressure sensors [17], fluorescent polymers properties to the straws.

The rolled leaves with synthetic and/or non-synthetic polymeric adhesives are dried at standard temperature and pressure for 8 hours to make sure that the glue has been dried properly and the leaf surfaces are gelled properly.

The advantage of using an oven for the drying process involves (a) a drying oven allows estimating the amount of moisture contents (approximately) in the leaves and can uniformly heat the leaves; (b) It allows a larger volume of the samples to be dried at the same time, thus higher throughput can be achieved; (c) It is a simple, highly accurate, and most economical as well as repeatable process for heating.

The synthesis techniques for the date palm tree straw involves cumbersome washing technique, which involves washing of the raw leaves with less than 40% concentrated ascorbic acid and to certify the removal of the dirt and any kind of microbial growth. It is followed by scrubbing of the leaves using different grade of abrasive sheets and two times washing in ethanol under ultrasonicator bath (Frequency ~40/60 KHz) for 15 minutes as well as washing in deionized water (DI Water) for 15 minutes. The leaves are then exposed to fresh water for soaking at STP. Moreover, to attest the purity and to avoid any kind of contamination on the wet leaves, they are exposed to hot air (temperature 80°

C. to 120° C.) for 5 minutes. This step assures the cleanliness as well as purity of the leaves. The leaves are then segregated into different boxes depending on their length, thickness as well as strength. Once, the leaves have been distributed into different boxes, the leaves of the individual boxes are subject to hydrothermal heating at 80° C. to 120° C. The completion of the hydrothermal steps will lead to secretion of the gluey or wax contents of the leaves from their surfaces, which along with selected combination of synthetic and/or non-synthetic polymeric adhesives are bonded to produce the end product. Finally, the rolled leaves with synthetic and/or non-synthetic polymeric adhesives are dried at STP for about 8 hours.

Synthesis of Hybrid Adhesive

The commercially available glue was mixed with Graphene Oxide Quantum Dots (GOQDs) to enhance its physical and chemical properties. The amount of GOQDs added to the glue was less than 50%.

Synthesis of Graphene Oxide Quantum Dots from Date Palm Seeds

In a typically proposed synthesis of graphene oxide quantum dots using carbonization of date seeds, 2 grams of dry date seeds were measured and baked for 8 h in hot air at 150° C., followed by crushing/grounding in a mortar and pestle for 2 hr to get a uniform distributed powder [13]. The dried date seed powder was then dissolved in 5 ml of deionized water and heated at 200° C. using a heating mantle [13]. On the appearance of the yellow color of the solution, the heating was stopped. The solution was then mixed with NaOH solution to get a PH 7 solution. The solution thus formed was liquidated and the remaining powder was vacuum dried at 60° C. Another proposed approach for the synthesis of GOQDs through sonochemical exfoliation is to mix the date seed powder in a 3:1 ratio of sulphuric acid and nitric acid followed by ultrasonication for 8-10 h [14]. The solution is then allowed to cool at room temperature and 100 ml ice of deionized water was added into it followed by drop wise addition of NaOH solution till the PH of the solution reaches 7 (neutral). The GOQDs synthesized was dispersed and homogeneously mixed with the synthetic or non-synthetic adhesive. This green and nontoxic approach of adding GOQDs to the adhesive and the date palm tree offers antibacterial [15], disinfection systems (healing and wound disinfection) [16], anti-bio fouling [17], bio-imaging markers (for monitoring of health condition) [18], humidity and pressure sensors [19], fluorescent polymers properties to the straws.

Straw Size

The size of the straw can be customized based on the type of application (Table 1). For instance, usual straw size that is used in restaurants, Cafeterias and hotels are of diameter 5.5 mm and length of 210 mm each. The straws from date palm can not only replace them, but also replace small straws that are used by beverage companies for packaged drinks.

Testing Phase

Toxicity, self-life, durability, environment friendly/sustainability are some of the factors which need to be evaluated for any products which are getting direct contact with sensory organs like mouth in day-to-day activity. Date palm tree leaves are low-cost, non-toxic, and opens up a scope for scalable production of straws as well as supports the sustainable development goals.

Toxicity

The toxic content of the straw itself is zero unless and until it is been chewed or swallowed completely. The date palm tree fruits comes under edible category subjected to processing and manufacturing. The leaves are biodegradable in nature and are non-toxic. The adhesive used is environmental friendly and as it falls under food grade category.

Crush Strength Test

Figure 2:
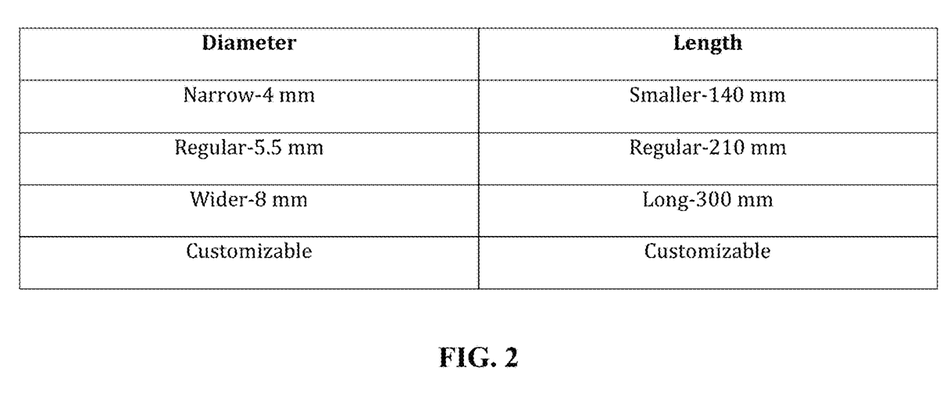
FIG. 2 shows straw standard size options.

The crush strength was determined by subjecting the various types of straws in use to a given loading (see FIG. 2). Date palm straw outperformed paper straws from China and was found to be almost as strong as current high-quality straws.

Shelf-Life

Under proper storage conditions, the shelf-life of the straws has been evaluated for 3 months under vacuum condition. Exposure to moisture will degrade the food products and organic products. However, these straws can remain in excellent condition if stored properly till they are used and discarded.

Straw Longevity

Figure 3:
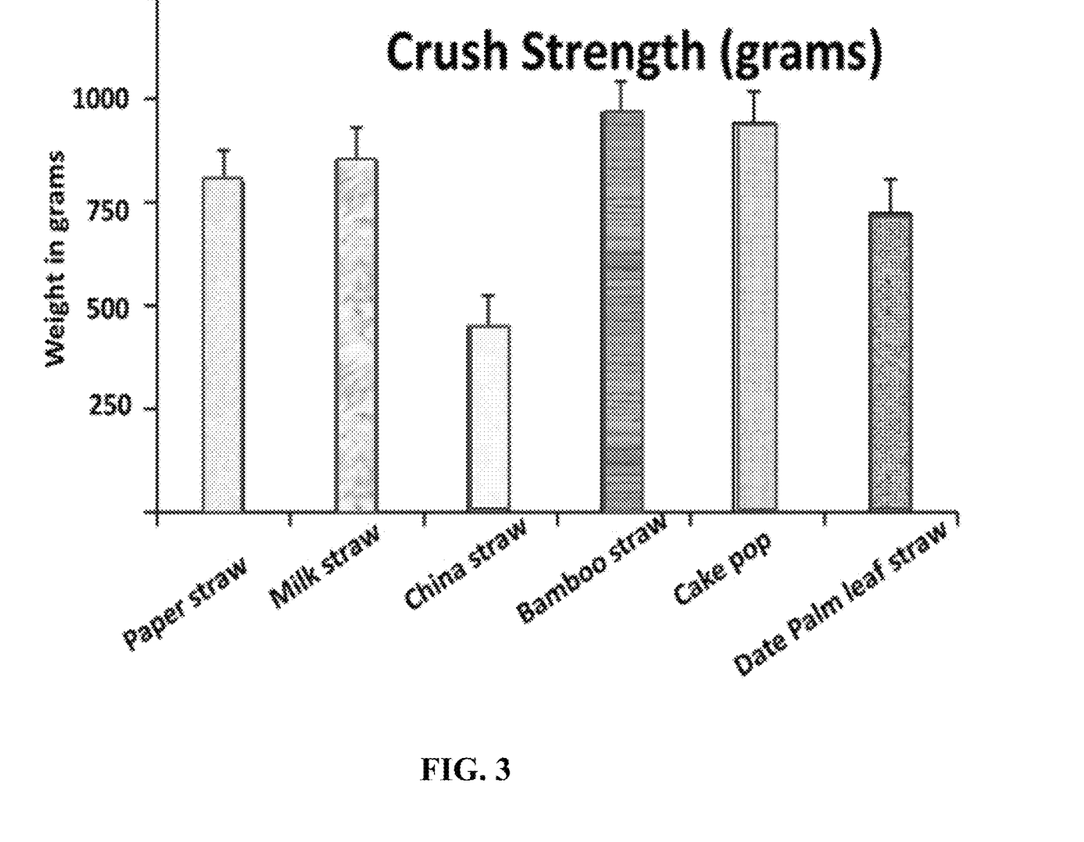
FIG. 3 shows crush strength comparison among the different types of straw.

Unlike plastic or wax-coated paper straws, date palm leaf straws, are stable and on exposure to hot or cold liquids (see FIG. 3). It can withstand in hot drinks or cold for up to 35 and 50 minutes respectively. In the "hard lid" tests, the cooler temperatures caused by ice extended the life of all straws. Three separate common drinks, such as milk, juice, and water, in the same temperature range and liquid level were used to test the straws longevity. The straws prepared are quite stable for minimum of 30 minutes under hot liquid, while are unaffected more than 40 minutes on exposure to juice or water.

Durability

Figure 4:
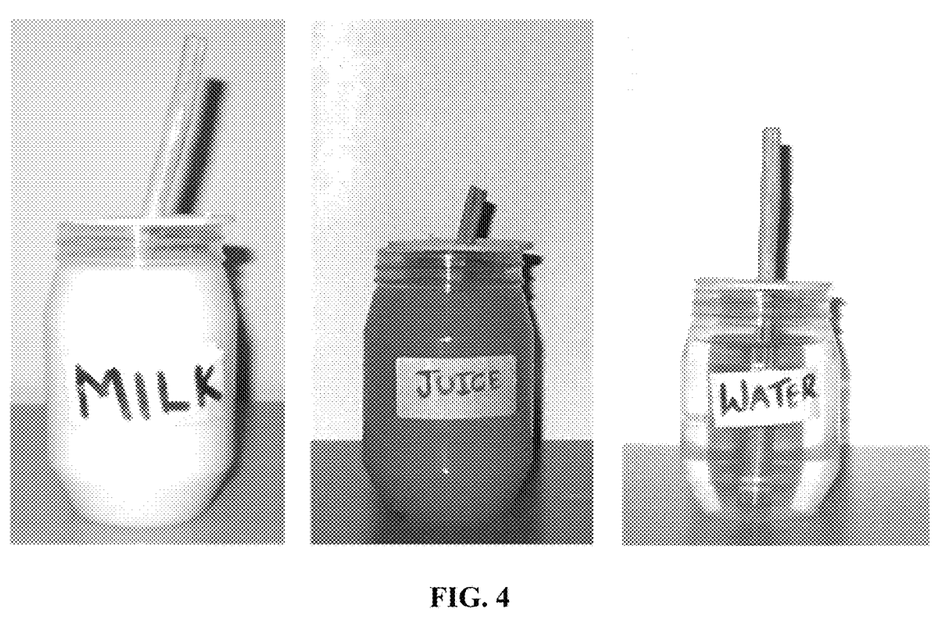
FIG. 4 shows straws subjected to testing under milk, juice and water.
Figure 5:
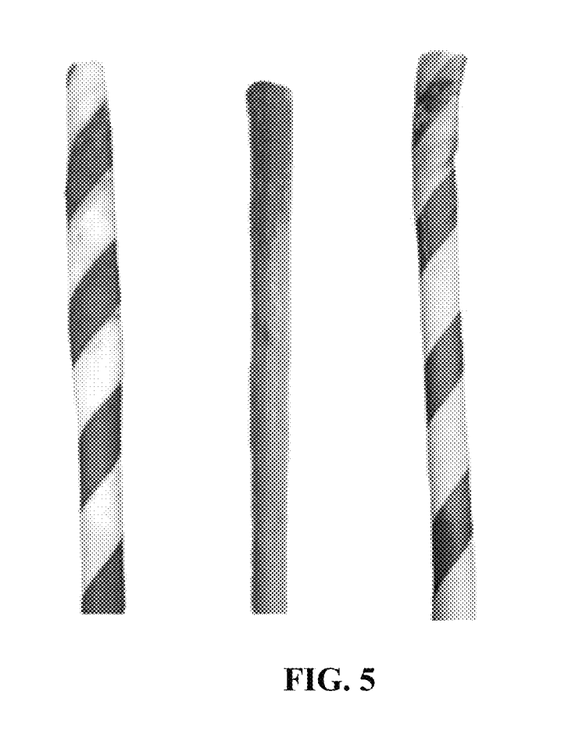
FIG. 5 shows that paper straws become more soggy than palm straws.

Date palm leaf straws can withstand for long time on being immersed in liquids. The palm straw exhibited more durability comparing the paper straw after removing them from respective liquids (see FIG. 4).

REFERENCES

[1] Sigler, M., 2014. The effects of plastic pollution on aquatic wildlife: Current situations and future solutions. Water Air Soil Pollut., Vol. 225. 10.1007/s11270-014-2184-6.

[2] Law, K. L., 2017. Plastics in the marine environment. Annu. Rev. Mar. Sci., 9: 205-229.

[3] Adamcova, D., M.D. Vaverkova, T. Masicek and E. Brouskova, 2016. Analysis of biodegradability of degradable/biodegradable plastic material in controlled composting environment. J. Ecol. Eng., 17: 1-10.

[4] Wilcox, C., E. Van Sebille and B. D. Hardesty, 2015. Threat of plastic pollution to seabirds is global, pervasive and increasing. Proc. Nat. Acad. Sci., 112: 11899-11904.

[5] Ritschel, C., 2018. Why is plastic bad for the environment and how much is in the ocean. The Independent, Apr. 18, 2018. https://www.independent.co.uk/life-style/plastic-badenvironment-why-ocean-pollution-how-much-single-usefacts-recycling-a8309311.html.

[6] Webb, H. K., J. Arnott, R. J. Crawford and E. P. Ivanova, 2012. Plastic degradation and its environmental implications with special reference to poly (ethylene terephthalate). Polym., 5: 1-18.

[7] Alam, M., Rikta, S. Y., Bahauddin, K. M., Hasnine, T., Kamal, A. K. I., 2018. Production of ecofriendly handmade paper from wastepaper and other local biomass material. Acad. J. Environ. Sci. 6, 147-155

[8] M. Jonoobi, M. shafie, Y. Shirmohammadli, A. Ashori, H. Zarea-Hosseinabadi, and T. Mekonnen, "A review on date palm tree: properties, characterization and its potential applications," Journal of Renewable Materials, vol. 7, no. 11, pp. 1055-1075, 2019.

[9] Vermeer Middle east FZCO, "Palm tree waste management in the UAE". https://vermeer-middleeast.com/environmental/palm-tree-wood-waste-management-uae/.

[10] S Mousavi, S Bereswill, M. M. Heimesaat, Immunomodulatory and Antimicrobial Effects of Vitamin C, European Journal of Microbiology and Immunology 9, 3, 73-79, 2019.

[11] J. Gao, Y. Zhu, F. Luo, Effects of ethanol combined with ascorbic acid and packaging on the inhibition of browning and microbial growth in fresh-cut Chinese yam, Food Sci Nutr. 6, 998-1005, 2018.

[12] W. F. Tinto, T. O. Elufioye, J. Roach, Chapter 22—Waxes, Editor(s): Simone Badal, Rupika Delgoda, Pharmacognosy, Academic Press, 2017, Pages 443-455, ISBN 9780128021040, https://doi.org/10.1016/B 978-0-12-802104-0.00022-6.

[13] Meziani, Mohammed J., et al. "Visible-light-activated bactericidal functions of carbon "Quantum" dots." ACS applied materials & interfaces 8.17 (2016) 10761-10766.

[14] Sun, Hanjun, et al. "Graphene quantum dots-band-aids used for wound disinfection." ACS nano 8.6 (2014): 6202-6210.

[15] Fá, M. A. U. R. O., et al. "Extracellular tau oligomers produce an immediate impairment of LTP and memory." Scientific reports 6 (2016): 19393.

[16] Wang, Dan, Jian-Feng Chen, and Liming Dai. "Recent advances in graphene quantum dots for fluorescence bioimaging from cells through tissues to animals." Particle & Particle Systems Characterization 32.5 (2015): 515-523.

[17] Sreeprasad, T. S., et al. "Electron-tunneling modulation in percolating network of graphene quantum dots: fabrication, phenomenological understanding, and humidity/pressure sensing applications." Nano letters 13.4 (2013): 1757-1763.

[18] Dong et al. "Blue luminescent graphene quantum dots and graphene oxide prepared by tuning the carbonization degree of citric acid." Carbon 50 (2012) 4738-4743.

[19] Ye et al. "Coal as an abundant source of graphene quantum dots" Nat Commun 4, 2943 (2013).

What is claimed is:

1. A method for manufacturing a biodegradable drinking palm tree straw, the method comprising:
   washing palm tree leaves with a solution of ascorbic acid, 99% ethanol, and water;
   cleaning the palm tree leaves with abrasive sheets;
   soaking the palm tree leaves;
   drying the palm tree leaves;
   heating the palm tree leaves to a temperature selected from a range of 60° C. to 140° C.;
   rolling the palm tree leaves;
   binding the rolled palm tree leaves using biodegradable food grade adhesive; and
   drying the rolled palm tree leaves;
   wherein the palm tree leaves are washed twice with a 99% ethanolic solution under an ultrasonicator bath and subsequently once with water.

2. The method of claim 1, wherein the palm leaves are selected from the group consisting of date palm tree leaves, coconut palm tree leaves, and oil palm tree leaves.

3. The method of claim 1, wherein the palm tree leaves are date palm tree leaves.

4. The method of claim 1, wherein the concentration of ascorbic acid of the solution is less than 50% v/v.

5. The method of claim 1, wherein cleaning the palm tree leaves comprises:
   scrubbing the palm tree leaves with abrasive sheets, wherein the grade of the abrasive sheets ranges from 15 to 40 micron.

6. The method of claim 1, wherein during at least one of drying the palm tree leaves and drying the rolled palm tree leaves, the palm tree leaves are dried with hot air.

7. The method of claim 6, wherein the hot air has a temperature of 70° C. to 130° C. and is applied to the palm tree leaves for one to fifteen minutes.

8. The method of claim 6, wherein the hot air has a temperature of 80° C. to 120° C. and is applied to the palm tree leaves for five minutes.

9. The method of claim 1, wherein the palm tree leaves are subject to hydrothermal heating at a temperature within the range of 70° C. to 130° C.

10. The method of claim 9, wherein the palm tree leaves are subject to hydrothermal heating at a temperature in the range of 80° C. to 120° C.

11. The method of claim 1, wherein binding the rolled palm tree leaves utilizes synthetic and non-synthetic polymeric adhesives.

12. The method of claim 1, wherein binding the rolled palm tree leaves utilizes synthetic and non-synthetic polymeric adhesives bound with graphene oxide quantum dots (GOQDs).

13. The method of claim 1, wherein binding the rolled palm tree leaves utilizes non-synthetic polymeric adhesives bound with graphene oxide quantum dots (GOQDs).

14. The method of claim 1, wherein binding the rolled palm tree leaves utilizes synthetic polymeric adhesives bound with graphene oxide quantum dots (GOQDs).

15. The method of claim 1, wherein the rolled and bound palm tree leaves are dried for 1 to 24 hours.

16. The method of claim 1, wherein the bound palm tree leaves are dried for 8 hours.

17. The method of claim 1, wherein the bound palm tree leaves are dried at standard temperature and pressure.

* * * * *